United States Patent
Narang et al.

(10) Patent No.: US 6,168,885 B1
(45) Date of Patent: Jan. 2, 2001

(54) FABRICATION OF ELECTRODES AND DEVICES CONTAINING ELECTRODES

(75) Inventors: Subhash C. Narang, Palo Alto; Susanna Ventura, Los Altos; Philip Cox, San Jose, all of CA (US)

(73) Assignee: SRI International, Menlo Park, CA (US)

( * ) Notice: Under 35 U.S.C. 154(b), the term of this patent shall be extended for 0 days.

(21) Appl. No.: 09/226,558

(22) Filed: Jan. 5, 1999

Related U.S. Application Data

(63) Continuation-in-part of application No. 09/149,880, filed on Sep. 8, 1998.
(60) Provisional application No. 60/097,706, filed on Nov. 29, 1998.

(51) Int. Cl.[7] .................................................... H01M 4/60
(52) U.S. Cl. ........................................... 429/214; 29/623.1
(58) Field of Search .............................. 429/212, 231.95, 429/214, 215; 29/623.1

(56) References Cited

U.S. PATENT DOCUMENTS

| | | | |
|---|---|---|---|
| 4,223,080 | * | 9/1980 | Auborn . |
| 5,340,668 | * | 8/1994 | Redey et al. . |
| 5,772,934 | * | 6/1998 | MacFadden . |
| 5,932,375 | * | 8/1999 | Tarcy et al. . |

FOREIGN PATENT DOCUMENTS

883200 A2 * 12/1998 (EP) .
10-172615 * 6/1998 (JP) .

* cited by examiner

*Primary Examiner*—Maria Nuzzolillo
*Assistant Examiner*—Susy Tsang
(74) *Attorney, Agent, or Firm*—Fish & Associates, LLP; Robert Fish

(57) ABSTRACT

Electrodes are manufactured using a fire-retardant solvent and a polymerizable monomer. Electrodes according to the present invention are contemplated to find applicability in substantially any electrode containing device, including batteries. A preferred class of fire-retardant solvents includes solvents that generate a fire-retardant gas upon decomposition. One subclass includes compositions that produce carbon dioxide upon decomposition. Other subclasses include species that generate non-$CO_2$ gases upon decomposition, such as $CO$, $SO_2$, $SO_3$, $NO$, $N_2O$, $NO_2$, or $N_2$. A second preferred class of fire-retardant solvents include solvents that are fire-retardant without generating a fire-retardant gas upon decomposition, and are electrochemically inactive. Subclasses here include the many phosphates, phosphazenes, borates, siloxanes, fluorinated carbonates and fluorinated ethers that are already known to be included in a fire-retardant electrolyte. It is contemplated that the same solvent may be used in both an electrode paste and an electrolyte. It is also contemplated that the same polymer may be used in both an electrode paste and an electrolyte. An exemplary polymer for this purpose is polyvinylidene fluoride (PVDF). In one or both such cases, an electrolyte may advantageously be applied directly to the porous electrode surface, providing excellent interlayer adhesion and thus low interfacial resistance.

18 Claims, 1 Drawing Sheet

FABRICATION OF ELECTRODES AND DEVICES CONTAINING ELECTRODES

This application claims benefit of Provisional Application 60/097,706 filed Nov. 29, 1998.

This application is a continuation-in-part of pending patent application Ser. No. 09/149,880 filed Sep. 8, 1998.

FIELD OF THE INVENTION

The field of the invention is fabrication of electrodes, including fabrication of batteries, supercapacitors, and other devices utilizing electrodes.

BACKGROUND OF THE INVENTION

Electrolytic cells containing an anode, a cathode, and a solid electrolyte are known in the art, and are commonly referred to as "solid" or "polymer" batteries. In such batteries discharge is characterized by lithium or other ions from the anode passing through the electrolyte to the electrochemically active material of the cathode, where the ions are taken up with the simultaneous release of electrical energy. During charging, the flow of ions is reversed so that lithium or other ions pass from the electrochemically active cathode material through the electrolyte, and are reintroduced back onto or into the anode. Because solid electrolytes typically have very poor conductivity, the electrolyte typically also contains a solvent or "plasticizer".

The negative electrode is the anode during discharge. Numerous anode active materials are known in the art, including lithium, alloys of lithium with aluminum, mercury, manganese, iron, or zinc, and intercalation anodes using various forms of carbon such as graphite, coke, mesocarbon microbeads, and tungsten, tin, or other oxides. Intercalation anodes typically also include a polymeric binder, i.e., a film-forming agent, suitable for forming a bound porous composite. The polymeric binder generally exhibits a molecular weight of from about 1,000 to about 5,000,000. Examples of suitable polymeric binders include ethylene propylene diene monomer (EPDM); polyvinylidene fluoride (PVDF), PVDF copolymers, ethylene acrylic acid copolymer (EAA), ethylene vinyl acetate copolymer (EVA), styrene-butadiene rubber (SBR), carboxymethylcellulose, polyacrylonitrile (PAN), and the like.

The positive electrode is the cathode during discharge. Numerous cathode active materials are also known in the art, including transition metal oxides, sulfides, and selenides. Representative materials include oxides of cobalt, nickel, manganese, molybdenum, and vanadium, sulfides of titanium, molybdenum, and niobium, chromium oxides, copper oxides, and lithiated oxides of cobalt, manganese and nickel, and the like. Intercalation cathodes are also known, and may utilize the same binders employed in the manufacture of anodes.

The active materials for anodes and cathodes are typically produced by suspending particulate material and the binder in a solvent to form an electrode paste. In the case of an anode, the particulate material would be an anode active material. In the case of a cathode, the particulate material would be cathode active material. The electrode paste is then layered onto a current collector, and the solvent is removed by volatilization (drying) or other methods. The porous electrode structure which remains includes particulate electrode material held adjacent to a current collector.

Anode current collectors typically include foils or grids comprising nickel, iron, stainless steel, or copper. Cathode current collectors typically include foils or grids comprising aluminum, nickel, iron, or stainless steel. An adhesion promoter can also be used to facilitate bonding between the anode or cathode material and its corresponding current collector.

Numerous solvents are known for the production of electrode pastes, depending on the desired process parameters. However, since the electrode paste solvent is generally removed by drying, the solvent is usually volatile. Commonly used solvents include acetone, xylene, alcohols, cyclohexanone, dichloromethane, dimethylacetamide (DMA), dimethylformamide (DMF), hexamethylphosphoramide (HMP), dimethylsulfoxide (DMSO), 1-methyl-2-pyrrolidone or N-methylpyrrolidone (NMP), etc., and mixtures thereof.

It is also known to remove the electrode paste solvent with an extracting solvent to produce a "dry" battery precursor, and then imbibe an electrolyte solvent and electrolyte salt into the dry precursor. Typical extracting solvents are diethyl ether and hexane.

In the manufacture of a solid polymer electrolytic cell, a viscous electrolyte precursor is typically deposited onto the anode or the cathode. The electrolyte precursor includes monomers or other polymerizable compounds, which are then cured to form the solid electrolyte. Curing is generally accomplished by application of heat, UV light, or other energy source. The final electrolyte typically comprises from about 5 to about 25 weight percent of the inorganic ion salt based on the total weight of the electrolyte. The percentage of salt depends on the type of salt and electrolytic solvent employed.

Solid polymer electrolytes are generally divided into the "dry" polymer electrolytes based on PEO, and gel polymers such as polyvinylidene fluoride (PVDF) based systems. Polymer systems that do not contain a plasticizer are known, but known plasticizer free systems must generally be operated at elevated temperatures. In secondary batteries, temperatures of the order of 80° C. are usually needed to obtain acceptable conductivity levels. This makes the PEO system impractical for use in many applications, in particular, the portable electronics markets. The gel based or plasticized polymer electrolyte systems offer a significant improvement in lithium ion conductivity at room temperature.

For systems that do contain plasticizers (electrolyte solvents), numerous such solvents are known. Examples include cyclic and non-cyclic carbonates such as propylene carbonate (PC), ethylene carbonate (EC), dimethyl carbonate (DMC), diethyl carbonate (DEC), methyl ethyl carbonate (MEC), dipropyl carbonate (DPC), dibutyl carbonate (DBC), as well as acetates, diesters such as oxalate, succinate, adipate, suberate and sebacate, which may or may not be substituted, low molecular weight polymers such as polycarbonates, polyacrylates, polyesters, and various other substances including polysiloxanes, gamma-butyrolactone, triglyme, tetraglyme, dimethylsulfoxide, dioxolane, sulfolane, and so on. When using propylene carbonate based electrolytes in an electrolytic cell with graphite anodes, a sequestering agent, such as a crown ether, is also often added in the electrolyte.

A pre-wetting agent may be employed to improve the interface between electrode and electrolyte (see U.S. Pat. No. 5,700,300 to Jensen et al, December 1997). Such agents are known to include a plasticizing solvent and a matrix forming polymer. Suitable solvents are well known in the art and include, for example, organic solvents such as ethylene carbonate, propylene carbonate, as well as mixtures of these compounds. Higher boiling point plasticizer compounds, such as dibutyl phthalate, dimethyl phthalate, diethyl phthalate, and tris butyoxyethyl phosphate are also suitable as long as the viscosity of the pre-wet material can be maintained at a suitably low level. Suitable solid polymeric matrix precursors are well known in the art, and include inorganic polymers, organic polymers, or a mixture of polymers with inorganic non-polymeric materials. One typical polymeric matrix precursor is urethane acrylate.

A secondary battery typically comprises several solid electrolytic cells in which the current from each of the cells is accumulated by a current collector. The total current generated by the battery is roughly the sum of the current generated from each of the individual electrolytic cells employed in the battery. Such an arrangement enhances the overall current produced by the battery to levels that render such batteries commercially viable.

Often, the various cells are spiral wound before being provided with a protective coating, with a porous separator inserted between anode and cathode to prevent shorting. It is also contemplated that an inert filler can be added to the electrolyte formulation to act as a separator. This filler can be an inert oxide such as alumina, a polymer powder such as polypropylene, or specialized separator pillars or particles designed to improve the laminate stability. Alternatively, the filler could be a woven or non-woven fabric. Riveting, stitching or incorporating mechanically interlocking components (for example hook and loop fasteners) can be used to further enhance the mechanical properties of the laminate. It is also known to eliminate a distinct separator by appropriate coating of at least one of the electrodes. (see U.S. Pat. No. 5,811,205 to Andrieu et al., September 1998).

Unfortunately, the use of flammable solvents and other compositions during manufacture is potentially quite dangerous. Such danger is especially prevalent in the manufacture of batteries, where any or all of the solvents used in electrode paste, extracting compound, electrolyte, and pre-wetting agents may all be flammable.

With respect to electrolytes, the flammability problem was addressed in U.S. Pat. No. 5,830,600 to Narang et al. (November 1998), which disclosed several novel classes of fire-retardant electrolyte compositions, including carbon dioxide generators. Examples include solvents comprising dicarbonates, esters, peresters, dioxalates, acyl peroxides, peroxodicarbonates, and Diels-Alder adducts of carbon dioxide. Such compositions are not only designed to be initially fire-retardant, but additionally is designed to become fire-retardant upon decomposition of the electrolyte. Narang et al. further addressed flammability of electrolytes in pending PCT/US98/25466 to Narang et al. (filed Dec. 1, 1998), that disclosed the use of compounds that generate fire-retardant gases other than carbon dioxide.

The flammability problem, however, still has not been resolved for the manufacture of electrodes, including the electrode manufacturing stage of battery production, where flammable solvents are generally employed to produce the electrolyte pastes. Thus, there remains a considerable need to provide methods and compositions for safely manufacturing electrodes.

SUMMARY OF THE INVENTION

The present invention provides methods and compositions for manufacture of an electrode using a fire-retardant solvent. Electrodes according to the present invention are contemplated to find applicability in substantially any electrode containing device, including batteries, supercapacitors, electrochromic devices, fuel cells, and displays.

First, a preferred class of fire-retardant solvents includes solvents that generate a fire-retardant gas upon decomposition. One subclass includes compositions in which the generation of fire-retardent gas is carbon dioxide. Examples are dicarbonates, esters, peresters, dioxalates, acyl peroxides, peroxodicarbonates, Diels-Alder adducts of carbon dioxide, and combinations thereof. Other subclasses include species that generate non-$CO_2$ gases upon decomposition, such as CO, $SO_2$, $SO_3$, NO, $N_2O$, $NO_2$, or $N_2$.

A second preferred class of fire-retardant solvents includes solvents that are fire-retardant without generating a fire-retardant gas upon decomposition, and are electrochemically inactive. Subclasses here include the many phosphates, phosphazenes, borates, siloxanes, and fluorinated carbonates and fluorinated ethers that are already known to be included in a fire-retardant electrolyte. The various classes and subclasses of solvents contemplated to be used in manufacturing electrodes are not necessarily exclusive, and it is contemplated that any mixture of any fire-retardant solvents may be employed.

In another aspect of preferred embodiments, the same solvent may be used in both an electrode paste and an electrolyte, as for example, in the manufacture of secondary polymer batteries. In another aspect of preferred embodiments, the same polymer may be used in both an electrode paste and an electrolyte. An exemplary polymer for this purpose is polyvinylidene diflouride (PVDF). In one or both such cases, an electrolyte may advantageously be applied directly to the porous electrode surface, providing excellent interlayer adhesion and thus low interfacial resistance. This facilitates high-speed fabrication of a cell laminate that can be cut for the individual cells. This also obviates the need for the time consuming extraction process and, therefore, the need to use porous current collectors.

Various objects, features, aspects and advantages of the present invention will become more apparent from the following detailed description of preferred embodiments of the invention, along with the accompanying drawing.

DETAILED DESCRIPTION

Definitions

Figure 1:
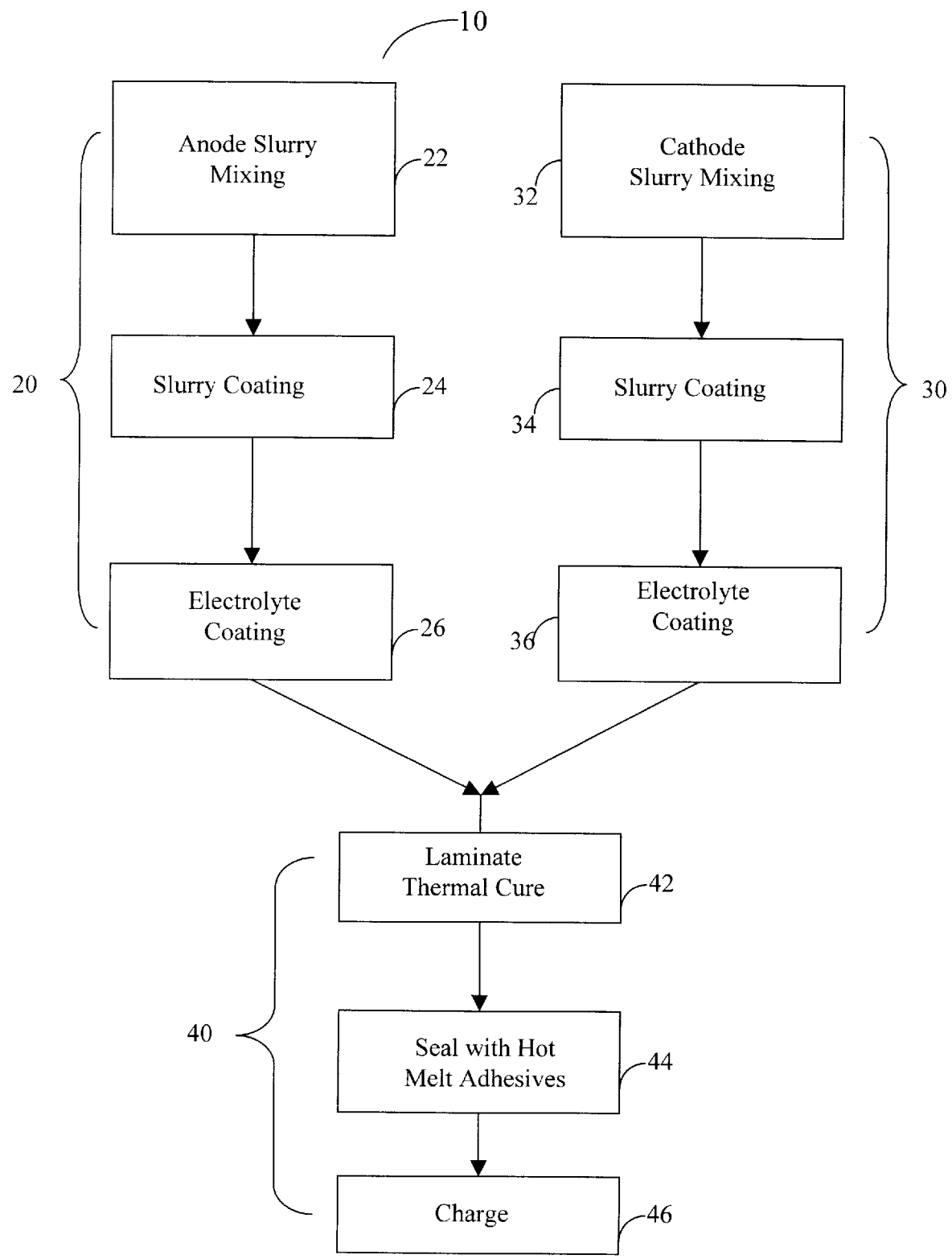
FIG. 1 is a flow diagram depicting manufacture of a secondary battery or other device having a cathode and an anode.

The practice of the present invention can employ, unless otherwise indicated, conventional techniques of battery fabrication, battery chemistry, and electrolyte chemistry. To that end, all patents, patent applications, publications and other types of references cited herein, whether supra or infra, are hereby incorporated by reference in their entirety. Nevertheless, despite the incorporation of references, the present text does not necessarily adopt the definitions and usages set forth in the references. Therefore, to clarify the definitions and usages of specific terms that are not defined elsewhere herein, we set forth the following.

The singular forms "a", "an" and "the" are used herein to include the plural unless the content clearly dictates otherwise. Thus, for example, reference to "an electrolyte additive" includes mixtures of such additives, reference to "the anode material" includes more than one such material, and the like.

As used herein the term "electrode" is used herein to mean a phase through which charge is carried by electronic movement. Electrodes can be metals or semiconductors, and they can be solid or liquid. Also as used herein, the term "electrolyte" is generally defined as a phase through which charge is carried by the movement of ions. Electrolytes may be any phase on the continuum of liquid to solid, including gels, pastes, fused salts, or ionically conducting solids, such as sodium β-alumina, which has mobile sodium ions.

As used herein the terms "anode material" and "anode" are used interchangeably, except where the context clearly indicates otherwise. Similarly, the terms "cathode material" and "cathode" are used interchangeably. These definitions are intended to eliminate confusion over the exact point at which the respective electrode material(s) is/are incorporated into, and thus becomes an electrode.

The term "metal" is used herein broadly to mean a composition having metallic properties, such as metallic luster, electrical conductivity, high chemical reactivity, and substantial physical strength. The definition includes an element selected from one of the metal and transition metal groups of the periodic table, alloys of such metals, metal ceramics (inclusions), superalloys, fusible alloys, and amalgams.

The terms "fire-retardant" and "nonflammable" are considered herein to be interchangeable, and are intended to mean a reduction or elimination of the tendency of a combustible material to burn, i.e., a "fire-retardant" material is one having a lower ignition susceptibility or, once ignited, lower flammability. Thus, a "fire-retardant composition" is one in which the basic flammability has been reduced as measured by accelerated rate calorimetry (see, e.g. Von Slacken et al. *Proc. Seventh Int'l Meeting on Lithium Batteries*, p. 12 (1994)), or by one of the art-accepted standard fire or heat impingement tests, or other standard test of reduced flammability, for example, ASTM D2863 (limiting oxygen index) (see, e.g., *Tests for Flammability of Plastic Materials for Parts in Devices and Appliances*, Underwriters Laboratories, Northbrook, Ill., 1991; *National Fire Codes*, National Fire Protection Association, Quincy, Mass., 1992; *Standard Test Method for Heat and Visible Smoke Release Rates for Materials and Products*, American Society for Testing and Material, Philadelphia, Pa., 1991; see, also, "Flammability" in *Encyclopedia of Polymer Science and Engineering*, Second Edition, Vol. 7, pp.154–210, John Wiley & Sons (New York), 1988).

The term "alkyl" is used herein to mean a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms.

The term "alkenyl" is used herein to mean a branched or unbranched hydrocarbon chain containing from 2 to 24 carbon atoms and at least one double bond. Preferred alkenyl groups herein contain 1 to 12 carbon atoms.

The term "alkoxy" is used herein to mean an alkyl group bound through a single, terminal ether linkage; that is, an "alkoxy" group may be defined as —OR wherein R is alkyl as defined above.

The term "aryl" is used herein to mean a monocyclic aromatic species of 5 to 7 carbon atoms, and is typically phenyl. Optionally, these groups are substituted with one to four, more preferably one to two, lower alkyl, lower alkoxy, hydroxy, and/or nitro substituents.

The term "aralkylene" is used herein to mean moieties containing both alkylene and monocyclic aryl species, typically containing less than about 12 carbon atoms in the alkylene portion, and wherein the aryl substituent is bonded to the structure of interest through an alkylene linking group. Exemplary aralkylene groups have the structure —$(CH_2)_j$—Ar wherein "j" is an integer in the range of 1 to 6 and wherein "Ar" is an aryl species.

The terms "halogen" and "halo" are used to mean fluoro, chloro, bromo, or iodo, and usually relates to halo substitution for a hydrogen atom in an organic compound.

"Optional" or "optionally" means that the subsequently described circumstance may or may not occur, and that the description includes instances in which said circumstance occurs and instances in which it does not. For example, the phrase "Optionally, these groups are substituted . . . " means that these groups may or may not be substituted and that the description includes both the instance when the groups are substituted and the instance when the groups are not substituted.

As used herein the term "SEI" means Solid Electrolyte Interface, i.e., the interface between a solid portion of an electrode and a solid, liquid or other electrolyte. Also as used herein, the term "effective SEI" means an interface between an anode and an electrolyte in a metal ion cell that is sufficiently impermeable to the electrolyte and solvent, and sufficiently permeable to the transit of the relevant ions, to provide a cycle life of at least 50 cycles.

To avoid possible confusion between a single cell and a battery which may have one or more cells, the terms "cell" and "battery" are used interchangeably, except where the context clearly indicates otherwise.

Drawing

Turning now to the drawing, FIG. 1 depicts a schematic 10 for manufacturing a secondary battery or other device. Schematic 10 generally comprises an anode production process 20, a cathode production process 30, and a battery assembly process 40.

Anode production process 20 generally comprises three steps. In anode slurry mixing step 22 an anode slurry (anode paste) is produced by mixing together a metal or material capable of intercalating metal ions, a binder, a solvent and optionally a monomer and a catalyst. Graphite is a preferred form of intercalation material, but other forms of carbon such as coke and mesocarbon microbeads and indeed other compositions besides carbon, are contemplated as well. Where a metal is used instead of metal ions in an intercalation material, acetylene black, graphite, or some other conducting filler may also be present.

The binder is preferably PVDF, although other binders including other fluororesins, ethylene-propylene-diene copolymer, styrene-butadiene rubber, polyacrylonitrile, and carboxymethylcellulose may be used instead of, or in addition to PVDF.

First, a preferred class of fire-retardant solvents includes those that generate a fire-retardant gas upon decomposition. One subclass includes compositions in which the generation of fire-retardent gas is carbon dioxide. While all such compositions are contemplated, preferred examples are dicarbonates, esters, peresters, dioxalates, acyl peroxides, peroxodicarbonates, Diels-Alder adducts of carbon dioxide, and combinations thereof. Especially preferred examples are those claimed in U.S. Pat. No. 5,830,600 to Narang et al. (November 1998), including dicarbonates, esters, peresters, dioxalates, acyl peroxides, peroxodicarbonates, and Diels-Alder adducts of carbon dioxide. Other preferred examples are: dimethylpyrocarbonate, di(t-butyl)dicarbonate, dimethyloxalate, and benzoylperoxide.

Subclasses that generate non-$CO_2$ gases upon decomposition, include generators of CO, $SO_2$, $SO_3$, NO, $N_2O$, $NO_2$, or $N_2$. Again, while all such compositions are contemplated, preferred solvents include those described in pending PCT/US98/25466 to Narang et al. (filed December 1998). Structure 1 exemplifies an especially preferred class of compounds that generate a fire-retardant gas upon decomposition.

Structure I

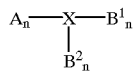

wherein,

X=N, C, S, NO, $N_2$, CO, SO;

A=aryl (including conjugated, non-conjugated), alkyl (including branched, straight-chain, conjugated, non-conjugated, heteroatom substituted), alkenyl (including branched, straight-chain, conjugated, non-conjugated, heteroatom substituted), alkoxy (including branched, straight-chain, conjugated, non-conjugated, heteroatom substituted), aralkylene (including branched, straight-chain, conjugated, non-conjugated, heteroatom substituted), annulene (i.e. completely conjugated monocyclic polyenes), conjugated hydrocarbons (such as fulvene, calicene, fulvalene, methylenecyclopropene), fused ring systems (such as naphthalene, anthracene, naphthacene, phenanthrene, triphenylene, pyrene, perylene, butalene, pentalene, azulene, heptalene, biphenylene, acenaphthylene), heteroatoms (including halogen, alkali metals, transition metals), alcohol (such as phenol, ethanol, butanol), hydroxyl, acetal, or ketal;

$B^1$ and $B^2$=null, oxygen, hydrogen, aryl (including conjugated, non-conjugated), alkyl (including branched, straight-chain, conjugated, non-conjugated, heteroatom substituted), alkenyl (including branched, straight-chain, conjugated, non-conjugated, heteroatom substituted), alkoxy (including branched, straight-chain, conjugated, non-conjugated, heteroatom substituted), aralkylene (including branched, straight-chain, conjugated, non-conjugated, heteroatom substituted), annulene (i.e. completely conjugated monocyclic polyenes), conjugated hydrocarbons (such as fulvene, calicene, fulvalene, methylenecyclopropene), fused ring systems (such as naphthalene, anthracene, naphthacene, phenanthrene, triphenylene, pyrene, perylene, butalene, pentalene, azulene, heptalene, biphenylene, acenaphthylene), heteroatoms (including halogen, alkali metals, transition metals), alcohol (such as phenol, ethanol, butanol), hydroxyl, acetal, or ketal;

n=an integer from 0–100;

where $B^1$ and $B^2$ are not null simultaneously;

where $B^2$ is null when X is $N_2$.

Those skilled in the art will appreciate that a limitation to Structure 1 present in the claims of the PCT/US98/25466 application is omitted herein, namely that "where $B^1$ and $B^2$ are not oxygen when X is CO." It will also be appreciated that while solvents are referred to herein as decomposing to produce a given gas, such decomposition does not necessarily take place to a significant degree under manufacturing or operating conditions.

One aspect of electrode production that may not be readily appreciated is that gas generating solvents present in an electrolyte paste may greatly aid in formation of an effective Solid Electrolyte Interface (SEI), especially at the anode. Timely formation of an SEI is important in that it reduces the first cycle capacity loss. In commercially available metal ion batteries, for example, first cycle capacity loss is generally limited to less than about 5–10%. In addition, an effective SEI is substantially impermeable to electrolyte, while still being relatively permeable to metal ions. This provides metal ion battery electrolytes with kinetic stability, and results in good cycle life. PCT patent application no. PCT/US98/25466 describes SEI formation using such solvents in the electrolyte, but not in electrode manufacture.

A second preferred class of fire-retardant solvents include solvents that are fire-retardant without generating a fire-retardant gas upon decomposition, and are electrochemically inactive. As used herein, the term "electrochemically inactive" means that the solvent is not substantially decomposed during normal operation of the electrode in a device housing the electrode. Subclasses here include the many phosphates, phosphazenes, borates, siloxanes, fluorinated carbonates and fluorinated ethers that are already known to be included in a fire-retardant electrolyte. Especially preferred examples of fire-retardant phosphate solvents are: triethylphosphate, trifluoroethylphosphate, trimethylphosphate, and 2-ethoxy-1,3,2-dioxaphopholane-2-oxide. Especially preferred examples of fire-retardant phosphazene solvents are: hexamethoxycyclo triphosphazene, hexa(trifluoroethyl) cyclotriphosphazene, methoxypentafluorocyclotriphosphazene, and trimethoxytrifluorocyclo triphosphazene. Especially preferred examples of fire-retardant borate solvents are: triethyborate, tripropylborate, tris(trimethyl)silylborate and tri (trifluoroethyl)borate. Especially preferred examples of fire-retardant siloxane solvents are: hexamethyldisiloxane, tetraethoxysilane, methyltris(trifluoro ethoxysilane). Especially preferred examples of fire-retardant fluorinated carbonates are: di(trifluorethyl)carbonate, perfluoropropylene carbonate, and (trifluoromethyl)ethylenecarbonate. Especially preferred examples of fire-retardant fluorinated ethers are: Fomblins and Galdens.

In addition to providing added safety due to non-flammability, a major benefit of using electrochemically inactive electrode material solvents contemplated herein is that they can be left behind in the cell. This avoids necessity of undergoing the extraction step typically utilized in production of the Bellcore type of batteries discussed above.

The various classes and subclasses of solvents contemplated to be used in manufacturing electrodes are not necessarily exclusive, and it is contemplated that any mixture of any fire-retardant solvents may be employed. For example, a preferred combination comprises: triethylphosphate and di(trifluoroethyl)carbonate.

Additionally, the slurry used in manufacturing electrodes may comprise a mixture of a commonly used solvent (e.g., NMP or DMA), in combination with one or more fire-retardant solvents in an amount sufficient to impart fire-retardant properties to the resulting slurry.

The monomer is added to increase the strength of the electrode, and where the monomer is included in both the slurry and the electrolyte, such addition can also facilitate a relatively seamless transition of ions from the electrolyte to the electrodes and vice versa. Such monomers may be polymerized in-situ. Several monomer groups can be used for these purposes, including siloxanes, epoxides, and oxetanes. The added monomer can be in the range of 0 to 50% of the coating formulation. It is specifically contemplated that the monomer can be polymerized in situ.

The catalyst is preferably $H_2PtCl_6$ (complex) although other catalysts such as benzoyleroxide, acetic anhydride, azobisisobutyronitrile and benzoin may be used instead of, or in addition to typical photo or thermal polymerization catalysts.

The specific compositions employed in making the anode slurry, as well as their relative percentages, may vary from embodiment to embodiment, and generally require experimentation for optimization. Nevertheless, it is contemplated that factors such as cost of materials, manufacturing convenience, and expected operating conditions such as temperature and vibration may be significant in optimizing a formulation. By way of general guidelines, it is contemplated that a useful slurry will have a carbon composition of about 20% to about 65%, a binder composition of about 2% to about 8%, and a solvent composition of about 30% to about 75%. All percentages are given as weight percent of the active electrode material.

A particularly preferred anode slurry formulation is graphite (about 25% to about 30%), PVDF (about 3% to about 5%), TEP (about 65% to about 75%) and DMPC (about 2% to about 4%).

The electrode structure, including electrode porosity, is of considerable interest in many applications because the structure can have a significant effect on the available energy and power. While all possible structures are contemplated, it is preferred that the electrode structure be consistent with the application of interest. Thus, in some applications insoluble components of the slurry may advantageously be formed into, or coated upon microbeads, micro-filaments or the like. Similarly, in high power, high energy applications, it may be desirable to provide the insoluble components as flakes or other forms having relatively high aspect ratios. Teaching in that regard is set forth in PCT patent application no. PCT/US98/26882 to Narang et al., filed Dec. 16, 1998, with priority to U.S. provisional application 60/068764 filed Dec. 23, 1997. In addition, it is preferred that the gas generator be included in such manner that it imparts porosity to the electrode, which is highly advantageous for high power devices.

In slurry coating step 24, the anode slurry is deposited onto a current collector. The term "current collector" is employed herein in its broadest sense, and all possible current collectors are contemplated. In fact, a wide range of current collectors is known in the art, including foils, grids or other forms of nickel, iron, stainless steel, copper, lead, lead dioxide, zinc, lithium, aluminum, mercury, titanium, and graphite.

All possible slurry coating techniques are also contemplated, including spraying, casting, printing, and extrusion. Depending on specifics of fabrication, the anode current collector will typically range from about 8 $\mu$m thick to about 25 $\mu$m thick.

In electrolyte coating step 26, a suitable electrolyte is deposited onto the anode. What constitutes a suitable electrolyte depends, of course, on the chemistry involved, and all chemistries are contemplated that can advantageously utilize fire-retardant solvents. For this reason there are innumerable contemplated electrolytes, including both organic and inorganic electrolytes. On the other hand, it is preferred that the electrolyte provide a relatively high conductivity, which in the case of a solid polymer battery is considered to be at least $10^{-3}$ S/cm. For many years, solid and gel electrolytes having conductivities higher than $10^{-3}$ S/cm were unknown at normal operating temperatures. U.S. Pat. No. 5,731,104 issued to Narang et al. (March 1998) and related patents disclosed classes of liquid electrolyte plastics and plasticizers that permitted solid and gel electrolytes having $10^{-3}$ S/cm.

Particularly preferred embodiments include lithium ion batteries, in which both anode and cathode comprise intercalation materials, and lithium metal batteries, in which the cathode comprises an intercalation material and the anode comprises substantially pure lithium. In either case the electrolyte will comprise a lithium ion-conducting compound, i.e., a composition capable of transporting lithium ions with sufficient low resistivity to be useful in a battery electrolyte. Lithium ion-conducting compounds include single-ion conducting polymer electrolytes as described in commonly assigned U.S. Pat. No. 5,061,581 issued to Narang et al., as well as in U.S. Pat. No. 5,548,055, entitled "Single-Ion Conducting Solid Polymer Electrolytes", issued to Narang et al. (August 1996). The disclosures of both of the aforementioned documents are incorporated herein by reference. Preferred lithium ion-conducting compounds include compounds of the formula Li—A, wherein A is an anion which may be Cl, $CF_3SO_3$, $ClO_4$, $BF_4$, Br, I, SCN, $AsF_6$, $N(CF_3SO_2)_2$, $PF_6$, $SbF_6$, $O(CO)R^1$, wherein $R^1$ is H, alkyl, aryl, alkenyl, halo, or the like. Preferred ion-conducting compounds include, for example, $LiPF_6$, $LiAsF_6$, $LiN(SO_2CF_3)_2$, and mixtures thereof. Solutions of lithium ion-conducting compounds in fire-retardant additives are preferably prepared to achieve 0.2 M to 2.0 M lithium, most preferably 0.5 M to 1.5 M lithium.

It is still further preferred that the electrolyte include one or more of the fire-retardant solvents described elsewhere herein. A particularly preferred electrolyte formulation includes PVDF (15 to 25%), EC (18 to 28%), DMC (18 to 28%), TEP (18 to 28%), dimethylpyrocarbonate (1 to 3%), $LiPF_6$ (5 to 15%). Another preferred electrolyte composition includes PVDF (10 to 20%), vinylterminated dimethylsiloxane (4 to 8%), methylhydrosiloxane-dimethylsiloxane copolymer (0.4 to 0.8%), platinum complex (0.04 to 0.08%), and EC (18 to 28%), DMC (18 to 28%), TEP (18 to 28%), dimethylpyrocarbonate (1 to 3%), $LiPF_6$ (5 to 15%).

As already set forth in U.S. patent application Ser. No. 09/149880 to Narang et al., several techniques for the direct application of a polymer electrolyte to an electrode has been developed. In an exemplary process, the polymer electrolyte is heated to a temperature between room temperature and 150° C. to form a melt and lower the viscosity to enable easy penetration into the electrode pores. The heating temperature is selected depending on the plasticizer composition and the polymer type and level to give a melt viscosity that can be applied to the electrode. The heated polymer is then applied directly to both electrodes either via a casting method or a spray technique. Such direct application is advantageous in that it improves interlayer adhesion and thereby reduces interfacial resistance.

Cathode production process 30 also generally comprises three steps, and corresponds in most respects with anode production process 20. In cathode slurry mixing step 32 a cathode slurry (cathode paste) is produced by mixing together materials similar to that for producing an anode paste, except that the resulting mixture is electronegative with respect to the anode. In a preferred cathode slurry for a lithium ion cell, for example, the slurry may advantageously include a lithiated metal oxide (30 to 60%), PVDF (3 to 10%), acetylene black (2 to 5%), a solvent (30 to 65%), a monomer such as vinylterminated dimethylsiloxane or acryloxy terminated polydimethylsiloxane (1 to 4%), and a catalyst. Slurry coating step 34 and electrolyte coating step 36 are then similar to slurry coating step 24 and electrolyte coating step 26, respectively.

Battery assembly process 40 generally comprises a lamination step 42, a sealing step 44, and a charging step 46. In lamination step 42, the electrolyte previously deposited on the anode and cathode have formed a mechanically stable gel, and the two polymer electrolyte coated electrodes are laminated together to give the electrochemical cell. As many layers as necessary can be laminated together to provide the desired capacity of the final electrochemical cell. Sealing step 44 and charging step 46 may be conventional.

In many instances a mechanical separator can advantageously be employed to physically separate the anode from the cathode. Suitable separators include woven or non-woven fabrics. In other embodiments, an inert filler can be added to the electrolyte formulation to act as a separator. Exemplary fillers can comprise an inert oxide such as alumina, a polymer powder such as polypropylene, or specialized separator pillars or particles designed to improve the laminate stability. Riveting, stitching or incorporating mechanically interlocking components (for example hook and loop fasteners) can be used to further enhance the mechanical properties of the laminate.

The specifics of the assembly process can also vary considerably from that described above. For example, circuit components including batteries and capacitors can be printed using an ink-jet or other printing process. In a particularly a preferred class of embodiments set forth in International Application No. PCT/US98/25088 to Narang et al, multilayer electronic components and circuits containing such components are printed by depositing a solution onto a substrate, and then causing a redox reaction in the solution to yield a layer of the component or circuit. Electrodes and even entire devices according the disclosure herein are amenable to manufacture in that manner.

EXAMPLES

Example 1

Preparation of Mesocarbon Microbeads Anode 4 g of Kynar 2822, copolymer of vinylidene fluoride and hexafluoropropylene, was dissolved in 91.2 g of TEP and heated to 100° C. Mesocarbon microbeads (MCMB) (35.8 g) was added to the mix and thoroughly stirred. The resulting slurry was coated on copper current collector.

Example 2

Preparation of Coke Anode 6 g of Kynar 741, polyvinylidene fluoride, was dissolved in 91.2 g of TEP and heated to 100° C. Conoco Coke (35.8 g) was added to the mix and thoroughly stirred. The resulting slurry was coated on copper current collector.

Example 3

MCMB Anode Containing Polymerizable Siloxane Monomer 3 g of Kynar 2822, copolymer of vinylidene fluoride and hexafluoropropylene, was dissolved in 91.2 g of TEP and heated to 100° C. After cooling vinyl terminated polydimethylsiloxane (DMS-V31, Gelest Inc., Tullytown, Pa.) (1 g), methylhydroxysiloxane-dimethylsiloxane copolymer (HMS-301, Gelest Inc.)(0.1 g) were added and mixed in. Mesocarbon microbeads (MCMB) (35.8 g) were added to the mix and thoroughly stirred. A platinum complex solution (SIP6830.0, Gelest Inc.) (0.01 g) was then added to the slurry. The resulting slurry was coated on copper current collector.

Example 4

Preparation of Mesocarbon Microbead Anode with PAN 4 g of polyacrylonitrile (PAN) was dissolved in 85 g of TEP and 5 g of dimethylpyrocarbonate. Mesocarbon microbeads (MCMB) (35.8 g) were added to the mix and thoroughly stirred. The resulting slurry was coated on copper current collector.

Example 5

Preparation of Mesocarbon Microbead Anode with a Fluorinated Carbonate 4 g of Kynar 2822, copolymer of vinylidene fluoride and hexafluoropropylene, was dissolved in 100 g of di(trifluoroethyl)carbonate. Mesocarbon microbeads (MCMB) (35.8 g) were added to the mix and thoroughly stirred. The resulting slurry was coated on copper current collector.

Example 6

Preparation of a Graphite Anode with a Cyclotriphosphazene 4 g of Kynar 2822, copolymer of vinylidene fluoride and hexafluoropropylene, was dissolved in 10 g of hexa (trifluoroethoxy)cyclotriphosphazene, 90 g triethyphosphate, and 5 g of ethylene sulfite. Lonza graphite KS-15 (40 g) was added to the mix and thoroughly stirred. The resulting slurry was coated on copper current collector.

Example 7

Preparation of Mesocarbon Microbead Anode with a Fluorinated Carbonate 4 g of Kynar 2822, copolymer of vinylidene fluoride and hexafluoropropylene, was dissolved in 100 g of 1 M solution of $LiPF_6$ in TEP. Mesocarbon microbeads (MCMB) (35.8 g) were added to the mix and thoroughly stirred. The resulting slurry was coated on copper current collector.

Example 8

Preparation of Lithium Cobalt Oxide Cathode with a Phosphate 4.5 g of the binder, Kynar 721 PVDF, are dissolved in 60 g of TEP. The mixture was heated to 100° C. to ensure the PVDF dissolved fully. 89 g $LiCoO_2$, 1 g Chevron acetylene black and 5.5 g of Lonza KS-6 graphite were added. The slurry was mixed for 12 hours, then coated on an aluminum current collector.

Example 9

Preparation of Lithium Cobalt Oxide Cathode 4.5 g of the binder, Kynar 721 PVDF, were dissolved in 60 g of 1 M LiPF6 in TEP. The mixture was heated to 100° C. to ensure the PVDF dissolves fully. 89 g $LiCoO_2$, 1 g Chevron acetylene black and 5.5 g of Lonza KS-6 graphite were added. The slurry was mixed for 12 hours, then coated on an aluminum current collector.

Example 10

Preparation of Lithium Cobalt Oxide Cathode with a Polymerizable Monomer 3 g of Kynar 2822, copolymer of vinylidene fluoride and hexafluoropropylene, was dissolved in 91.2 g of TEP and heated to 100° C. After cooling acryloxy-terminated polydimethylsiloxane (DMS-U22, Gelest Inc., Tullytown, Pa.) (1 g), and benzoylperoxide (0.02 g) were added. Lithium cobalt oxide (80 g), Chevron acetylene black (1 g) and Lonza KS-6 were added to the mix and thoroughly stirred. The resulting slurry was coated on the current collector.

Example 11

Preparation of Lithium Nickel Cobalt Oxide Cathode with a Phosphate and $CO_2$-Gas Generator 4.4 g of Kynar 2822, copolymer of vinylidene fluoride and hexafluoropropylene, was dissolved in 80 g of TEP and 51 g. of dimethylpyrocarbonate. $LiNi_xCo_{1-x}O_2$ (51 g) and Chevron acetylene black (2.9 g) were added to the mix and thoroughly stirred. The resulting slurry was coated on an aluminum current collector.

Example 12

Preparation of Manganese Oxide Cathode 4 g of polyacrylonitrile was dissolved in 85 g of TEP. To this solution $MnO_2$ (50 g) and Chevron acetylene black (5 g) were added. The slurry was mixed thoroughly before being coated on an aluminum current collector.

Example 13

Preparation of Polymer Electrolyte Film

Polyvinylidene fluoride (3 g), vinylterminated dimethylsiloxane (1 g), methylhydroxysiloxane-dimethylsiloxane copolymer (0.1 g), a platinum complex solution (0.01 g), lithium hexafluorophosphate (2 g), and a solution of ethylene carbonate;diethylcarbonate:triethylphosphate 1:1:1 (12 g) are mixed and heated to 120 degC. To the resulting melt, a platinum complex solution (0.01 g) was added and a film was formed by hot-pressing in a mold.

Thus, specific embodiments and applications of electrode fabrication techniques have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:
1. A method of fabricating an electrode comprising:
providing a current collector;
providing a mixture including an active electrode material and a first fire-retardant solvent wherein the mixture further comprises a polymerizable monomer;
and combining the current collector and the mixture to produce an electrode.
2. The method of claim 1 wherein the first solvent produces a fire-retardant gas upon decomposition.
3. The method of claim 2 wherein the fire-retardant gas is selected from the group consisting of CO and $CO_2$.
4. The method of claim 2 wherein the fire-retardant gas is selected from the group consisting of $SO_2$ and $SO_3$.
5. The method of claim 2 wherein the fire-retardant gas is selected from the group consisting of NO, $N_2O$, $NO_2$, and $N_2$.
6. The method of claim 2 wherein the fire-retardant gas increases the porosity in the electrode.
7. The method of claim 2 wherein the fire-retardant gas assists in forming a solid electrolyte interface.
8. The method of claim 1 further comprising including polyvinylidene fluoride (PVDF) in the mixture.
9. The method of claim 1 wherein the first solvent is electrochemically inactive and is fire-retardant without generating a fire-retardant gas upon decomposition.
10. The method of claim 9 wherein the fire-retardant solvent is selected from the group consisting of a phosphate, a phosphazene, a borate, a siloxane, a fluorinated carbonate and a fluorinated ether.
11. The method of claim 1 wherein the first solvent produces a fire-retardant gas upon decomposition and further comprising a second solvent that is electrochemically inactive and is fire-retardant without generating a fire-retardant gas upon decomposition.
12. The method of claim 11 further comprising including polyvinylidene fluoride (PVDF) in the mixture.
13. The method of claim 12 further comprising fabricating the electrode without employing a solvent extraction step.
14. A method of manufacturing a battery comprising;
providing at least one electrode according to any of claims 1–13; and
operatively coupling the at least one electrode to an electrolyte.
15. The method of claim 14 wherein the battery comprises a lithium ion battery.
16. The method of claim 14 wherein the battery comprises a lithium metal battery.
17. The method of claim 14 further comprising applying the electrolyte directly to the surface of the at least one electrode.
18. The method of claim 14 further comprising including at least one of polyvinylidene fluoride (PVDF) and polyacrylonitrile (PAN) in the electrolyte.

* * * * *